(12) United States Patent
Pfeiffer

(10) Patent No.: US 6,588,950 B1
(45) Date of Patent: Jul. 8, 2003

(54) OPTICAL TRANSMISSION SYSTEM AND TRANSMITTERS AND RECEIVERS

(75) Inventor: Thomas Pfeiffer, Stuttgart (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/492,196

(22) Filed: Jan. 27, 2000

(30) Foreign Application Priority Data

Feb. 6, 1999 (DE) .......................... 199 04 940

(51) Int. Cl.⁷ .......................... H04B 10/00; H04B 10/20
(52) U.S. Cl. .......................... 398/140; 398/58
(58) Field of Search .................. 359/154, 118, 359/124; 398/58, 69, 140, 66; 372/26, 28, 38.02, 38.07

(56) References Cited

U.S. PATENT DOCUMENTS 4,703,474 A * 10/1987 Foschini et al. ............ 359/114
6,038,357 A * 3/2000 Pan ............................ 359/124

OTHER PUBLICATIONS

S. Wagner et al., "Broadband High–Density WDM Transmission Using Superluminescent Diodes", Electronics Letters, vol. 26, No. 11, IEEE, May 24, 1990.*
A. Mendez et al., "Code Division Multiple Access (CDMA) Enhancement of Wavelength Division Multiplexing (WDM) Systems", IEEE International Conference on Communications (ICC'95), 1995.*
M. Kavehrad et al., "Optical Code–Division–Multiplexed Systems Based on Spectral Encoding of Noncoherent Sources", Journal of Lightwave Technology, vol. 13, No. 3, IEEE, 1995.*
P. Fernando et al., "Optical Carrier Synthesis in Coherent Lightwave Systems", IEE Colloquium on Source for Coherent Optical Communication, 1991.*

* cited by examiner

Primary Examiner—Leslie Pascal
Assistant Examiner—Shi K. Li
(74) Attorney, Agent, or Firm—Sughrue Mion, PLLC

(57) ABSTRACT

An optical transmission system with transmitters and receivers is proposed wherein a narrow-band CDMA transmission is combined with a WDM transmission and a point-to-point connection for up to 256 channels is provided.

6 Claims, 2 Drawing Sheets

OPTICAL TRANSMISSION SYSTEM AND TRANSMITTERS AND RECEIVERS

BACKGROUND OF THE INVENTION

The invention is based on an optical transmission system and transmitters and receivers for an optical transmission system for the transmission of frequency-coded signals.

The as yet unpublished German Application 197 48 756.4 has disclosed a receiver for spectrally-coded optical signals. A transmission network for coded optical signals comprises optical transmission lines, optical splitters and optionally optical amplifiers, and serves to transmit coded, multiplexed optical signals. Each transmitter contains a coder in which the signals to be transmitted are coded before being transmitted into the optical transmission network. The coding is effected optically, for example by frequency coding using an optical filter. Each receiver which wishes to receive the data of a specific transmitter must contain a decoder tuned to the coder of this specific transmitter. In the simplest case, the frequency bands which transmit optical signals and the frequency bands which block optical signals are the same both in the coder and the decoder. The known CDMA (Code Division Multiple Access) processes are primarily suitable for the transmission of bit rates which are not too high (>155 MBit/s). The CDMA process is suitable for use as a multipoint-to-multipoint network, such as for example a LAN. If one considers the resolution in the individual receivers, up to approximately 32 channels can be transmitted in parallel in this process.

SUMMARY OF THE INVENTION.

The object of the invention is to propose a simple multipoint-to-multipoint connection system which makes a large number of channels available and can be implemented using simple components.

The optical transmission system according to the invention has the advantage of combining narrow-band CDMA transmission with WDM (Wavelength Division Multiplex) transmission and thus making up to 256 channels available multipoint-to-multipoint. Advantageously, a combined process of this kind can be implemented using transmitters of simple construction with no special demands on the specification, e.g. the wavelength stability, of the transmitting laser. As the transmitting modules are not subject to any special demands, simple and cost-efficient implementations are possible. Advantageously, an optical transmission system for frequency-coded signals is created in that the coding is generated by modulation of the injection current of the laser diode and, by means of special modulation with the data signal, a simple detection in the receiver is possible. The special modulation in the transmitter and the detection thereof in the receiver facilitate a very simple construction of the receiver. In particular, the use of a differential amplifier, which is costly to implement and sensitive in respect of its tuning, is avoided. The transmitters and receivers used for the optical transmission system are of very simple construction.

An exemplary embodiment of the invention is illustrated in the drawings and explained in detail in the following description.

DETAILED DESCRIPTION OF THE INVENTION

Figure 1:
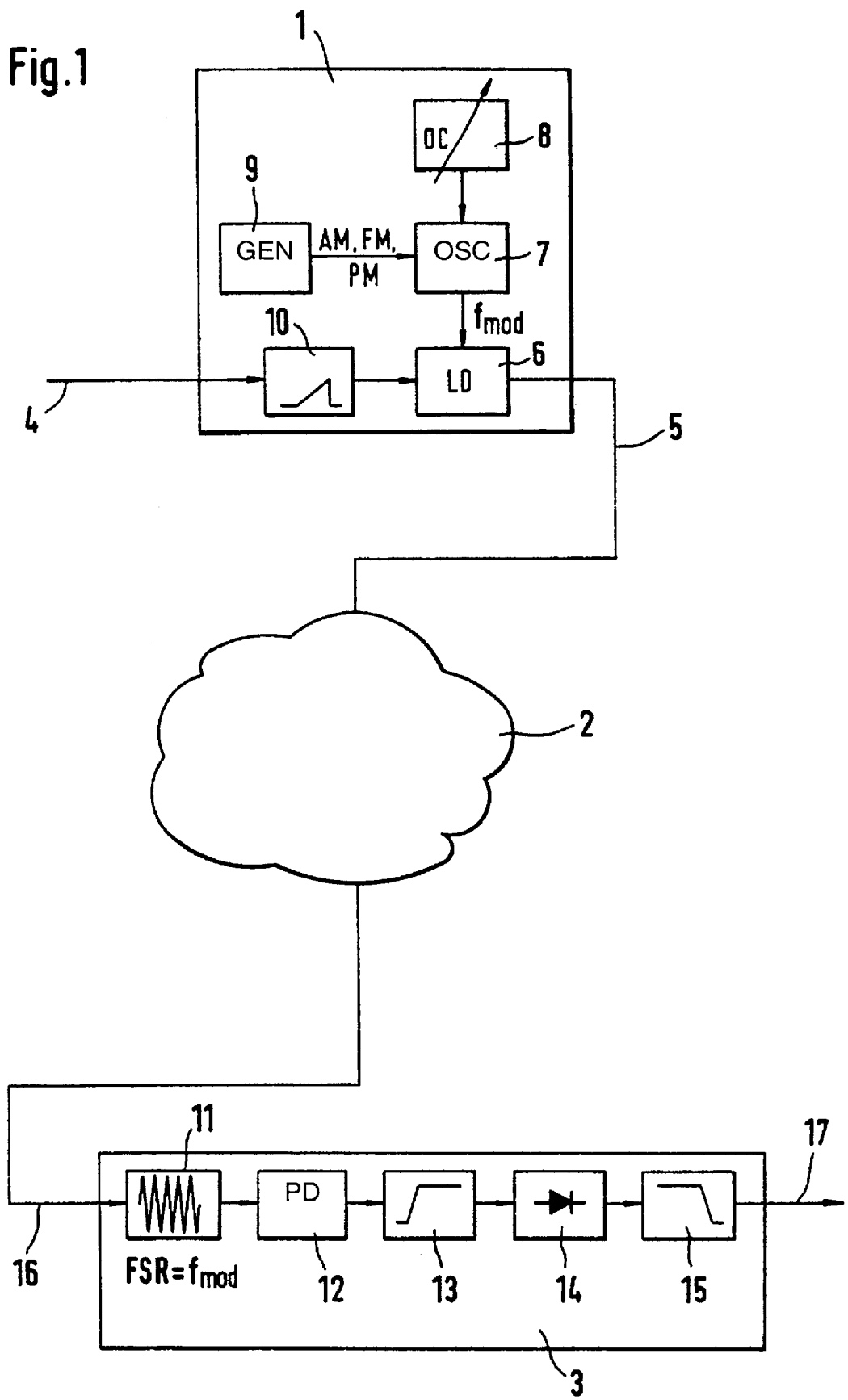
FIG. 1 illustrates a transmission system with transmitter and receiver.

FIG. 1 illustrates the construction of an exemplary system comprising a transmitter 1, a transmission network 2 and a receiver 3. In the transmitter 1 an optical source 6 is connected both to a data input 4 and to an oscillator 7 (OSC). The data input 4 is connected to the optical source 6 not directly but via a ramp generator 10. The oscillator 7 has an input to a noise generator 9 (GEN) and an input to a current control stage 8. To generate the comb structure of the optical signal required for the CDMA transmission, the injection current of the laser is directly modulated. Such a process has already been described in the as yet unpublished DE 198 22 616.0. The injection current of the laser 6 is operated with a periodic function via the current control stage 8, which defines the modulation frequency, and via the oscillator 7. Such, for example, sinusoidal modulation of the injection current with the frequency $f_{mod}$ generates an optical comb spectrum consisting of the superimposition of amplitude- and frequency-modulated components. The width of the comb spectrum results from the function $\ddot{A}f = 2 \times m \times f_{mod}$ (where m is the modulation index in the order of magnitude of 100). Theoretical considerations and measurements indicate that the system capacity is increased if the individual lines of the optical comb are blurred. A line width of $f_{mod}/F$ with the finesse F of 10 to 30 is optimal. To achieve this increase in line width, the modulation signal of the oscillator is blurred via the noise generator 9. Here the modulation can consist of amplitude-, frequency- or phase modulation. Overall, an optical spectrum corresponding to a spectrum generated by a LED, followed by filtering by a Fabry-Perot filter, occurs in the transmitter. The data signal which is applied to the input 4 of the transmitter is likewise directly modulated onto the injection current of the laser. Here the ramp generator 10 generates an injection current corresponding to the clock rate of the data, which leads to a small frequency modulation and thus to a shift in the position of the frequency comb in the spectrum. The frequency deviation is substantially smaller than the overall spectral bandwidth of the comb. Here the data states "0" and "1" differ by virtue of the magnitude of the deviation and by the switching on and off of a deviation for the data bits 1 and 0. The thus generated frequency combs, which change their position in accordance with the clock rate of the data, are fed into the transmission network 2 via the optical output 5. At the location of the receiver, the optical data are received via the optical input channel 16. In the receiver 3 an optical filter 11 is connected to a photodiode 12 (PD). The output of the photodiode is connected to the input of an electric filter 13 which in turn is connected to a microwave detector 14. An electric low-pass filter 15, whose output 17 supplies electric data, is connected to the output of the microwave detector 14. It is also possible, and favorable for the analysis, to include a HF amplifier between the photodiode 12 and the electric filter 13. The optical filter 11 has a defined free spectral region FSR which corresponds to the modulation frequency $f_{mod}$ of a transmitter in the transmission system. The optical filter 11 can consist for example of a Mach-Zehnder filter or a Michelson filter. These optical filters only transmit a frequency comb which corresponds to their free spectral region. Due to the modulation with the data signal, the optical comb shifts slightly so that a photocurrent with the frequency $B \cdot f_{data}/f_{mod}$ occurs across the photodiode for each bit, where B represents the data bit rate. The other transmitters in the transmission system do not generate a high-frequency-modulated photocurrent as their frequency comb in each case differs from that of the optical filter. Only a small amplitude modulation with the data rate is detected. This residual modulation is eliminated via the electric filter 13, which can consist of a high-pass filter or a band-pass filter. The lower cut-off frequency of this electric filter here is greater than the frequency of the data bit rate. As a result, a high-frequency modulation in the range $B \cdot f_{data}/f_{mod}$ is obtained, which is demodulated with an HF detector of envelope curves. Then the signal of the microwave detector 14 is smoothed by a low-pass filter. Here the low-pass filter has a cut-off frequency of 0.7·B for example. In this exemplary embodiment the data signal is modulated onto the comb frequency with a ramp function, leading to a simple detection of the resultant high-frequency signal. However it is also conceivable to use other types of modulation to impress the data onto the injection current of the laser, for example sinusoidal forms or triangular functions. In such cases, the electric spectrum becomes more complex and the analysis is adapted accordingly. The advantages of such a transmission system reside in the high-power optical source, the possibility of setting an optical channel by selecting the modulation frequency of the laser, the definition of the optical spectrum by means of a modulation waveform, a simple optical receiver with no active control of the free spectral region of the filter, and a simple optical detection with no differential amplifier. The laser diode is not subject to stringent demands. The central wavelength is not of great significance as a frequency comb is generated. Data for an exemplary embodiment of a transmission system as described in the foregoing are listed in the following:

N=16 (number of transmitters/receivers)

B=20 Mbit/s $f_{mod}$=160 MHz

Äf=40 GHz $f_{data}$=800 MHz for "1"; 0 MHz for "0"

The proposed transmission system is particularly suitable for low bit-rate applications of up to 20 Mbit/s per transmitter. It is particularly simple to use in a multipoint-to-multipoint network, for example a LAN, as here a TDMA arrangement is not possible and a WDMA arrangement would be too costly. In addition to the low costs, the problem-free changing of the communications channel between two subscribers is of particular advantage. The transmitter must tune its modulation frequency to the free spectral region of the fixed optical filter in the desired receiver. This is easily possible using the oscillator 7. To increase the spectral bandwidth of the transmitter, it is also possible to use another electrical oscillator which is operated at an integral multiple of the modulation frequency $f_{mod}$. If the modulation frequency is in the order of magnitude of the relaxation frequency of the laser, the bandwidth can be increased by orders of magnitude. In this way, bandwidths of up to 200 GHz are possible. Transmission systems comprising 16 channels, each with 20 Mbit/s, can be implemented with such bandwidths.

Figure 2:
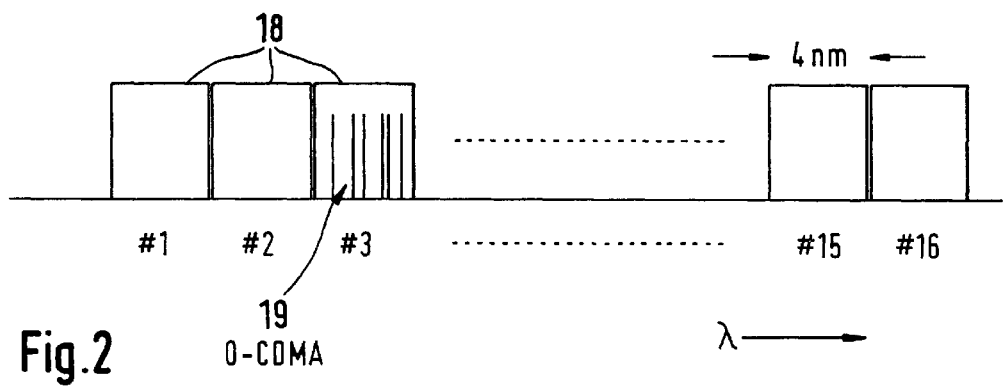
FIG. 2 illustrates a CDMA process employing windowing technology.

The proposed transmission system can be used in combination with WDM (Wavelength Division Multiplex) technology to substantially increase the number of channels. For this purpose, as shown in FIG. 2, the optical bandwidth shown over the wavelength ë is divided into individual WDM windows 18. The optical bandwidth of such a window here is 4 nm for example. A narrow-band CDMA process with up to 16 channels is installed within a WDM-window 18. It is thus possible to operate 256 channels with a bandwidth of 64 nm. Simple optical demultiplexing is possible within each WDM window. In addition, it is simple to select the laser for the transmitter as only 16 different central wavelengths need be defined. If the laser wavelength is approximately in the centre of the particular window, the laser is already suitable for use in such a system. Temperature controls also are not needed in such a system as the central wavelength is not of great significance, provided it remains in the relevant window.

Figure 3:
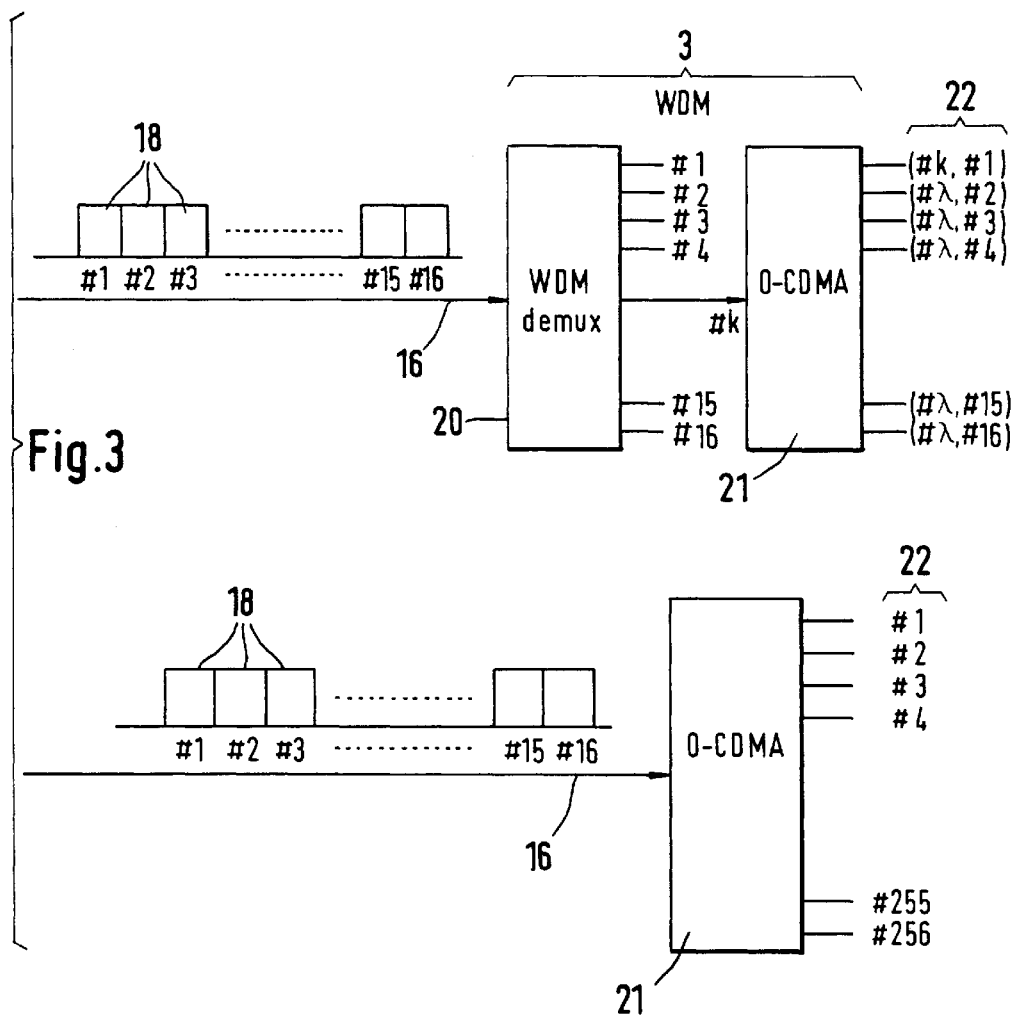
FIG. 3 illustrates a WDM process combined with CDMA.

FIG. 3 illustrates the demultiplex process of a combined WDM-CDMA transmission path. In the receiver 3 the WDM windows are firstly decoded before the optical CDMA analysis takes place in the demultiplexer 21. The input signal 16 thus is firstly disassembled in the WDM demultiplexer 20 and then passes through the optical CDMA demultiplexer 21 and is available as signal of individual channels 22. FIG. 3 illustrates another embodiment in which the individual WDM windows do not all contain the same optical CDMA sub-coding. In this case the optical codes for 256 transmitters are differently configured and are distributed between different WDM windows. For this embodiment the input signal need only pass through an optical CDMA demultiplexer 21. The channels 1 to 256 are then available at the output.

The proposed combination of WDM process and optical CDMA process can also be applied to already described CDMA processes which do not correspond to the above described embodiment. This is a simple system construction which, especially at the access level, permits a cost-efficient multipoint-to-multipoint solution for up to 256 channels.

What is claimed is:

1. An optical transmission system for transmitting frequency-coded signals, wherein at least one transmitter generates a plurality of discrete, equidistant frequency lines within the width Äf of the comb spectrum by modulation $f_{mod}$ of the injection current of the laser diode, and the at least one receiver can be tuned to the equidistant frequency lines of individual transmitters, characterised in that the data signal with the bit rate B is modulated-on with a frequency deviation $f_{data}$ greater than Äf of the laser, and a signal of frequency $B \cdot f_{data}/f_{mod}$ is detectable in the receiver.

2. A transmitter for a transmission of frequency-coded signals comprising a data input for electrical data signals, a laser and an output for optical signals, wherein the injection current of the laser is operated at least with a periodic waveform $f_{mod}$ of an oscillator and the data are modulated thereon by means of an additional change in the centre frequency with a few $f_{mod}$, and wherein the injection current of the laser is additionally operated with a noise signal.

3. A transmitter for a transmission of frequency-coded signals comprising a data input for electrical data signals, a laser and an output for optical signals, wherein the injection current of the laser is operated at least with a periodic waveform $f_{mod}$ of an oscillator and the data are modulated thereon by means of an additional change in the centre frequency with a few $f_{mod}$, and wherein the data modulation is effected by generating a ramp for the injection current of the laser.

4. A transmitter for a transmission of frequency-coded signals comprising a data input for electrical data signals, a laser and an output for optical signals, wherein the injection current of the laser is operated at least with a periodic waveform $f_{mod}$ of an oscillator and the data are modulated thereon by means of an additional change in the centre frequency with a few $f_{mod}$, and wherein the bandwidth is increased by means of a further, additional modulation of the injection current with a multiple of $f_{mod}$.

5. A receiver for the reception of spectrally coded, optical signals comprising an optical filter whose free spectral region corresponds to the frequency spacing of the frequency lines of a transmitter, characterised in that the received signals of frequency $B \cdot f_{data}/f_{mod}$, applied to a photodiode, generate different frequencies for data states 1/0 and these frequencies can be analyzed in a microwave detector.

6. A receiver according to claim 5, characterised in that the data modulation is selected by means of a high-pass filter or band-pass filter downstream of the photodiode, and having passed through an envelope-curve detector the HF modulation is smoothed in a low-pass filter in the form of an electric signal.

* * * * *